June 19, 1934.  S. BRAND  1,963,733
CASH REGISTER
Filed Dec. 8, 1930    4 Sheets-Sheet 3

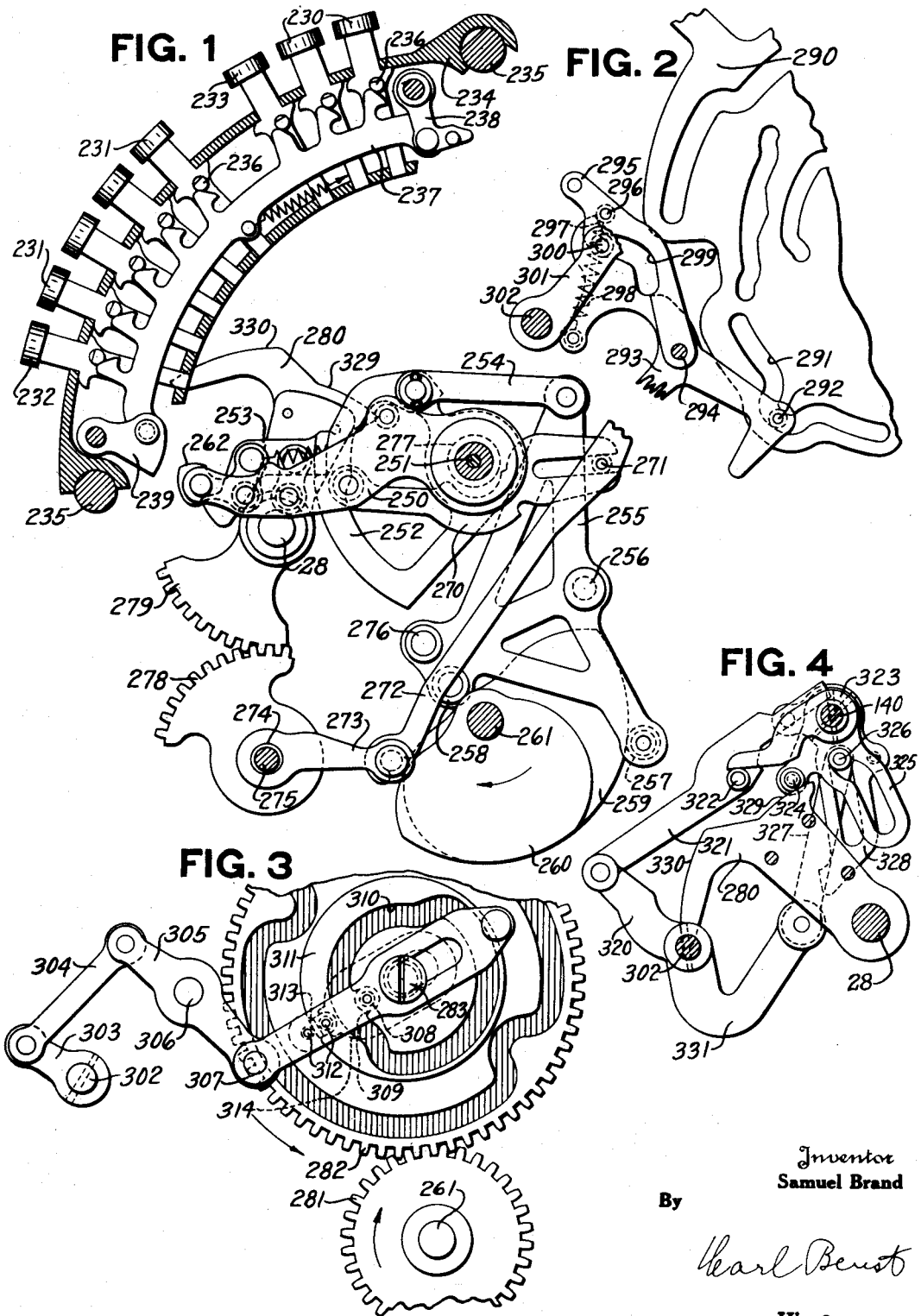

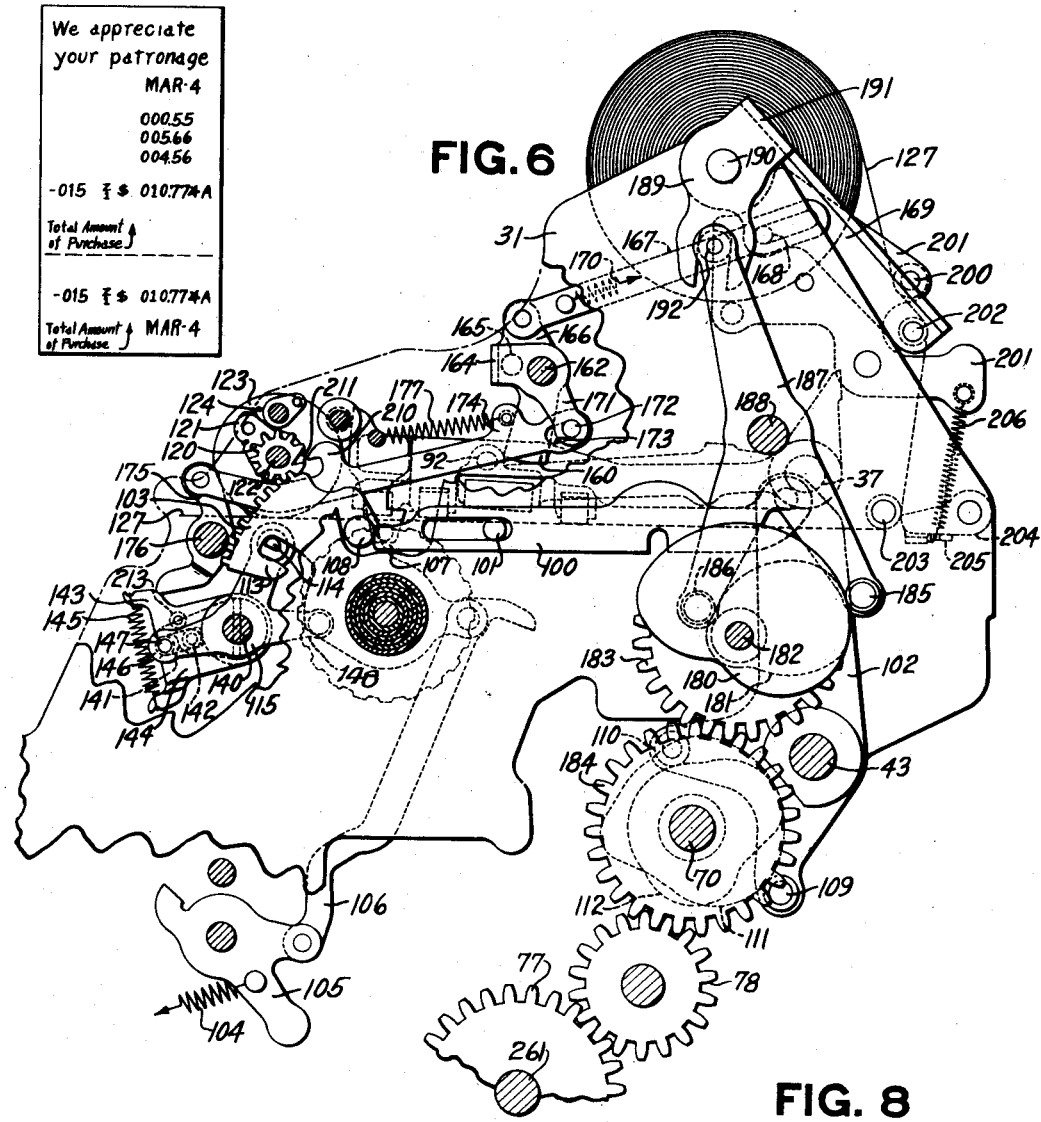

Inventor
Samuel Brand
By
Earl Beust
His Attorney

Inventor
Samuel Brand

His Attorney

Patented June 19, 1934

1,963,733

UNITED STATES PATENT OFFICE 1,963,733

CASH REGISTER

Samuel Brand, Dayton, Ohio, assignor to The National Cash Register Company, Dayton, Ohio, a corporation of Maryland Application December 8, 1930, Serial No. 500,855

8 Claims. (Cl. 235—3)

This invention relates to improvements in cash registers and similar machines, and particularly of the type shown in United States Letters Patent to Samuel Brand, No. 1,812,194, issued June 30, 1931, and is directed to the printing mechanisms of such machines.

In machines adapted to print and issue an itemized receipt with the total of the items printed thereon, it is frequently desirous to issue an itemized stub receipt, with the total of the items printed on the main body of the receipt, and also printed on the stub portion thereof.

In machines issuing a receipt without the stub, the printing hammers receive one printing movement, but certain of the printing hammers must be disabled when printing the items. That is, the electrohammer which prints the name of the store or any other desired information, and the date, is disabled, as is the hammer which effects the printing of the consecutive number. This disabling of the hammers is to eliminate the printing of everything except the items during item entering operations. Such printing from the electroplate, consecutive number wheels, the date, and any other information, need be printed only once, and is effected when the total of the items is printed.

The hammer operating mechanism is common to all hammers, and is given two actuations during each operation of the machine when printing and issuing stub receipts.

Specifically, during the entry of each item the hammer operating mechanism is given two actuations, and during the printing of the total it is also given two actuations.

It is therefore necessary to effect certain controls over the hammers during the entry of the items of a multiple-item transaction, during the printing of the total of those items, and also during the entry of single-item transactions.

As set forth in the Brand patent above mentioned, the item hammer is actuated during the entry of the items to print the item entered, and is also actuated during the printing of the total, to print a part of the total from the same type wheels; the total printing hammer being in printing alignment with the item printing hammer to print that part of the total which comes from the overflow wheels, and also the transaction character, clerk's initial, and consecutive number.

During the entry of each item of a multiple-item transaction all of the hammer operating mechanisms, as above stated, are given two actuations, but the hammers are so controlled that the total hammer and the electroplate and date hammer are prevented from effecting any printing during both movements of the hammer operating means, but the item hammer is allowed to operate once, which operation occurs during the second actuation of the hammer operating means, said item hammer being prevented from being operated during the first actuation of the hammer operating means.

During the printing of the total, the electroplate hammer is operated once and prevented from being operated during the first actuation of the hammer operating means; but the total hammer and item hammer are operated upon each actuation of the hammer operating means.

During the entry of a single-item transaction the electroplate hammer is disabled during the first actuation of the hammer operating means, and is operated during the second actuation of the hammer operating means. During this same kind of a transaction the total hammer and the item hammer are actuated twice during each actuation of the hammer operating means.

It is, therefore, an object of this invention to effect a control over all hammers so that they will function during the entry of multiple-item transactions and during the entry of single-item transactions, in the manner above set forth.

With this and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings

Fig. 1 shows the control key bank and its differential mechanism.

Fig. 2 shows a portion of the total lever and also a part of the mechanism operated thereby, which mechanism cooperates with the printer of the present invention.

Fig. 3 shows a portion of the mechanism for controlling the drive as determined by the total lever.

Fig. 4 is a detail of the check feed control means, shown in the position it assumes at the end of a multiple-item transaction.

Fig. 5 is a view of an itemized stub receipt printed by the improved mechanism shown.

Fig. 6 shows the printer in general with the novel disabling controlling means for the hammers.

Fig. 7 is a detail view of the electrohammer, and the disabling means therefor, and also shows a perforator attached to the hammer.

Fig. 8 is a front elevation of the perforator blade.

*In general*

Figure 9:
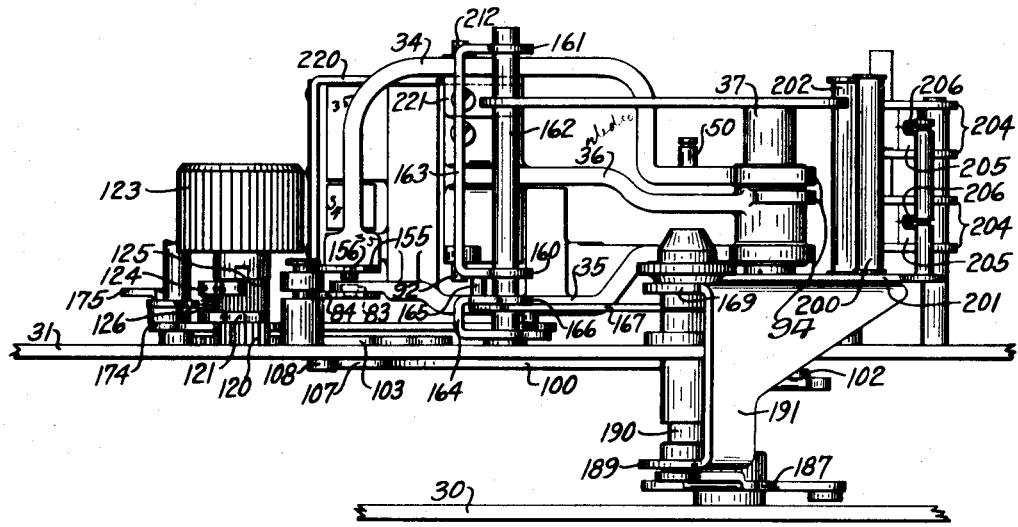
Fig. 9 is a detail plan view of the various impression hammers with a part of the slacking device, and the feeding mechanism for the check or receipt strip.

This invention is illustrated as applied to the type of machine disclosed in Letters Patent of the United States, Nos. 1,817,883, and 1,865,147, issued to Bernis M. Shipley on August 4, 1931 and June 28, 1932, respectively; and in Letters Patent of the United States No. 1,812,194, issued to Samuel Brand on June 30, 1931.

In machines of the type disclosed in the above mentioned patents, type carriers are adjusted differentially under control of depressible keys. Printing hammers carried by arms pivoted on a common center, and operated by cams to withdraw the arms from the type carriers, and springs to impel the hammers against the type carriers, are provided to make the impressions on the receipt paper.

When printing the items of a multiple-item transaction, all hammers except the one known as the item hammer, are disabled. The item hammer is wide enough to print only from those amount type carriers which are adjusted by the differentials under control of the depressible keys. The total hammer is wide enough to print from the higher, or overflow, amount type carriers and from the clerk's and transaction type carriers, and the consecutive number. When printing the total of a multiple-item transaction, both the item and the total hammers are operated to print from all the type wheels simultaneously.

DETAILED DESCRIPTION

*Keys and differential mechanism*

The keyboard and differential mechanism of the present application is substantially like that shown in the previously mentioned Shipley Patent No. 1,865,147.

For the purposes of the present invention, it is not thought necessary to either illustrate or describe the amount keys or their differential mechanism.

Due to the fact that certain mechanisms relating to printing of the stub receipt, for both multiple and single-item transactions, which mechanisms are later described, are effected by what is known as the transaction or control bank of keys and the differential mechanism associated therewith, this bank of keys and said differential mechanism are illustrated herein (Fig. 1), and will be briefly described.

This bank of keys is used to control the machine for multiple-item and single-item transactions, and contains eight keys, which are described in detail in the last mentioned Shipley patent.

When entering multiple-item transactions, one of the two top keys is used, and when entering single-item transactions, one of the five bottom keys is used.

The two top keys 230 control the machine for entering multiple-item transactions for "charge" and "cash" transactions respectively. The four upper keys 231 of the lower group are used to control the machine for single-item transactions representing "cash", "charge", "recd. on acct." and "paid out", respectively. The bottom key 232 is used for all operations of the machine that involve a no sale, such as making change or the opening of the drawer to check the money therein, and on any other occasion when the proprietor may wish to open the drawer without registering any of the sale transactions, such as "cash", "charge", etc.

A release key 233 is used to release either one of the two multiple-item transaction keys 230 after the completion of such transaction. Depression of this key will also release any other depressed key 231 or 232.

All of the keys 230, 231, 232 and 233 are carried by the usual key frame 234 supported on cross rods 235. Each key has a stud 236 cooperating with a spring drawn detent 237 supported on arms 238 and 239 mounted in the key frame 234.

When any one of the keys, except the release key 233, is depressed, it is retained in such position by the detent 237, as described in the last mentioned Shipley patent. The keys are what is known in the art as "stay-down" keys, that is, they remain depressed after the operation of the machine is completed, and can only be released by depression of another key in the same bank. The depressed key 231 or 232 can be released at the end of every operation of the machine, but the operated key 230 is locked depressed during several successive operations which constitute a multiple-item transaction. But after the total of a multiple-item transaction has been printed the depressed key 230 can be released in the usual manner.

These keys 230 and 231 control the setting of the differential mechanism, which in turn controls the positioning of a cam arm, and the latter controls the setting of a printer control shaft to be hereinafter described.

This differential mechanism briefly includes a differentially adjustable arm 250 mounted on a rod 251. The arm 250 is releasably connected to a driver 252 by means of the usual latch 253. The driver 252 is connected by a link 254 to a lever 255 pivoted at 256. The lever carries rollers 257 and 258 cooperating with cam plates 259 and 260 of a double plate cam secured to a main drive shaft 261. This shaft 261 rotates in a clockwise direction, and is given one complete turn upon each operation of the machine, that is, it receives one complete rotation for the entry of a single-item transaction, and receives as many complete rotations for the entry of the several items of a multiple-item transaction as there are items. It also receives two complete rotations for every totaling operation, in a manner to be later described.

Clockwise movement of this shaft, through the lever 255 and link 254, moves the driver 252 first clockwise and then counter-clockwise. This driver, through the latch 253, carries the differential arm 250 with it until the end 262 of the supporting bell crank for the latch contacts and is stopped by the inner end of whichever one of the keys 230, 231 or 232 is depressed, whereupon the latch is withdrawn from the driver 252 which continues its regular excursion in clockwise direction. Upon the return of the driver, the latch, being spring drawn, effects a driving connection between the differential arm 250 and the driver 252 when the latter reaches the position in which the arm 250 was disconnected therefrom.

The differential arm 252 has pivoted thereto one end of the usual beam 270, the other end of the beam being slotted to embrace a stud 271 in a link 272 one end of which is pivoted to an arm 273 secured to a sleeve 274 on the rod 275.

Considering the parts to be in the positions shown in Fig. 1, the clockwise movement of the differentially adjustable arm 250 moves the left end of the beam 270 upwardly, thus lowering the right end thereof, and at the same time lowering the link 272 to rock the arm 273 in clockwise direction.

To insure that the right end of the beam is positioned corresponding to the differential setting of the left end thereof, the lever 255 carries a roller 276, which roller contacts the under side of the beam moving it positively so that its upper edge contacts a collar 277 mounted on the rod 251.

The sleeve 274 has secured thereto a segment 278 meshing with a segment 279 loose on a stud 28. The segment 279 is secured to a cam arm 280, the purpose of which will be hereinafter described.

From the above description it is very clear that the cam arm 280 will be set in a position corresponding to the position of the differential arm 250, as determined by the keys 230, 231 and 232.

Due to this beam construction for setting the cam arm 280, which beam construction is well known in the art, the cam arm 280 remains in the position in which it was set at the end of the operation of the machine, that is, it does not return to a normal position due to the fact that the right end of the beam 270 and the link 272 always remain, at the end of each operation, in the position in which they were set during that operation.

It is not thought necessary to go into any detailed description of the mechanism for driving the main cam shaft 261, and therefore, but brief mention will be made as to how this shaft receives its motion. Any well known drive mechanism may be used to operate this shaft, such as an electric motor illustrated and described in United States Letters Patent, No. 1,144,418, issued to Kettering and Chryst on June 29, 1915.

Sometimes it is desirable to operate the type of machine referred to by hand, and for the accomplishment of this purpose, the shaft 261 has secured thereon a gear 281 (Fig. 3) meshing with a gear 282, the latter being twice the diameter of the former, and is mounted on a screw stud 283 supported in the machine side frame. As shown in the previously mentioned Brand Patent No. 1,812,194, this large gear 282 may be given one-half of a rotation by a manually operable handle, which half-turn gives the drive shaft 261 a complete rotation.

Printing mechanism

The printing mechanism in machines of the type to which this invention relates is usually located at the left side of the machine.

A printer frame 31 (Figs. 6 and 9) spaced from the main left side frame 30, by studs not shown, supports substantially all of the printing mechanism.

The printing mechanism includes type carriers 32 (Fig. 10) from which the receipt is printed, such type carriers being adjusted differentially under control of depressible keys and supported by nested sleeves 33 extending laterally from the left main side frame 30 through the printer frame 31 as fully illustrated in the previously mentioned patents.

Three hammers (Figs. 10 and 11), including an item hammer 34, a total hammer 35, and an electrohammer 36, are provided to take impressions from the type carriers 32. Two cams 69 and 71 are provided to actuate the three hammers, the cam 69 being adapted to actuate the electrohammer 36, and the cam 71 being adapted to actuate the item hammer 34 and a total hammer 35. The connections between the cam 71 and the hammers 34 and 35 will be described first.

Item and total-hammer operating mechanism

The item hammer 34 and the total hammer 35 are pivoted on a stud 37 (Figs. 10 and 11), projecting from the printer frame 31. A bail 39, extending between two arms 38, on the shaft 37, is provided to actuate the two hammers 34 and 35. The right-hand arm 38 (Fig. 11) has secured thereto an arm 40, connected to an operating arm 42 by a link 41. The arm 42 is pivoted on a shaft 43, and has a roller 74 and nose 76 cooperating with the cam 71 in the usual and well known manner.

The bail 39 overlies an arm 44 on the total hammer operating lever 45, pivoted on the stud 37. A spring 46 is connected to the operating lever 45 and acts to hold the arm 44 against the underside of the bail 39, the bail in turn being limited in its movement by an extension 47 on the lever 42 striking the underside of a block 48. Thus this block 48 determines the normal position of the lever 42, link 41, arms 40 and 38, bail 39, and operating lever 45.

A spring 49 normally holds a stud 50 on the total hammer 35 against the underside of an extension 51 of the operating lever 45.

When the shaft 70 is rotated clockwise (Fig. 10) the lobe 72 (see also Fig. 11), strikes the roller 74 and cams the arm 42 clockwise, and the arm through the link 41 rocks the arms 40 and 38, and bail 39, clockwise. Clockwise movement of the bail 39 rocks the arm 45 clockwise and through the spring 49 rocks the hammer 35 clockwise.

The cam 71 is wide enough to contact both the roller 74 and the nose 76 of the arm 42. During its rotation the cam 71 first strikes the roller 74, but near the end of the camming action of the lobe 72, the cam passes from beneath the roller 74, but at this time the nose 76 rides the lobe 72. When the end of the lobe 72 passes from beneath the nose 76, the lever 42 is rocked rapidly counter-clockwise by the powerful spring 46 until the extension 47 thereon strikes the block 48. The quick counter-clockwise movement of the lever 42 is transmitted to the hammer 35, and the hammer is carried forward on its own momentum when the lever 42 is stopped by the block 48. The stopping of the lever 42 also stops the link 41, arm 38, bail 39 and lever 45. Movement of the hammer 35 is permitted by the stretching of the spring 49. After the impression is taken the spring 49 returns the hammer 35 to its normal position as shown in the drawings.

The hammer operating mechanism is given a second actuation during each rotation of the cam 71, by a lobe 73 in the same manner as by the lobe 72, for reasons hereinafter explained.

The item hammer 34 is actuated by the cam 71 in the same manner as just described for the total hammer 35. The hammer 34 has associated therewith an operating lever 52 (Fig. 11) provided with an arm 53 cooperating with the bail 39. An extension 57 on the operating lever 52 cooperates with a stud 56 on the item hammer 34. A spring 55 normally holds the stud 56 against said arm 57.

Actuation of the bail 39 by the lobes 72 and 73 in the manner above described results in the actuation of the lever 52 and hammer 34 in the same manner as above described for the hammer 35.

However, the hammers 34 and 35 are subject to controls hereinafter described which may prevent tripping of the hammers by either lobe 72 or 73.

*Electroprinting hammer operating mechanism*

A separate train of mechanism is provided to actuate the electrohammer 36. This train of mechanism is the same in principle of operation as that for actuating the item hammer 34, and the total hammer 35, described above.

To actuate the electrohammer 36 a cam 69 is provided, which cam is a duplicate of cam 71. The cam 69 is fastened on the shaft 70 and has a lobe 68 which cooperates with a roller 59 and nose 97 on a hammer operating arm 67 pivoted on the stud 43. A link 66 connects arm 67 with an arm 63 of one lever of a pair of levers 61. A bail 60 connects the pair of levers 61 and overlies a shoulder 65 on the electrohammer 36. A spring 64 maintains the shoulder 65 in contact with the bail 60.

When the cam 69 is rotated the lobe 68 first strikes the roller 59, but near the end of the camming action of the lobe 68, the lobe passes from beneath the roller 59, but at this time the nose 97 rides the lobe 68. When the end of the lobe 68 passes from beneath the nose 97, the hammer operating arm 67 is rocked rapidly counter-clockwise by the powerful spring 62, until the extension of operating arm 67 strikes the underside of the block 48. The quick counter-clockwise movement of the arm 67 is transmitted to the electrohammer 36 by the connections described. When the arm 67 is suddenly arrested, the hammer 36 moves farther on its own momentum until it strikes the type carriers 32 and makes the impression. This independent movement of the hammer is permitted by stretching the spring 64. After the impression is made the spring 64 returns the hammer 36 to its normal position, as illustrated in the drawings.

A lobe 99 is provided on the cam 69 to cause a second impression to be made from the electro when desired.

*Impression hammer throwout mechanism*

When entering items of a multiple-item transaction only the item hammer 34 is operated, and it is operated only once during such item entering operations.

When printing the total of a multiple item, or when entering a single item transaction, two impressions are to be made by the item hammer 34 and the total hammer 35 acting together.

Thus when entering an item of a multiple-item transaction it is necessary to prevent any operation of the total hammer 35, and to permit only one operation of the item hammer 34, but the cams 69 and 71 are each provided with two lobes to actuate the hammers. In order to prevent one operation of the item hammer 34 during the entry of a multiple-item transaction, a stud 212 (Figs. 9 and 11) is provided on the hammer 34, which provides a convenient means for holding the hammer 34 from being operated by its spring 38 when a detent 161 (Fig. 9), later described, is positioned over such stud. The detent 161 is timed to be positioned over the stud 212 when the lobe 72 actuates the item hammer mechanism, but is withdrawn before the lobe 73 actuates this mechanism.

However, when entering an item of a multiple-item operation the total hammer 35 must be disabled during both actuations of the hammer operating mechanism by the lobes 72 and 73.

Therefore, a disabling plate 80 (Figs. 10 and 11) pivoted on the outer one of the nested sleeves 33, is provided with an upwardly extending arm 81 having a flange 82 which projects over and into the path of travel of a stud 83 on a plate 84 secured to the total hammer 35, when entering the items of a multiple-item transaction. Thus, as the arm 51 of the operating lever 45 is rocked clockwise by the lobes 72 and 73 of the cam 71, the stud 83 striking the flange 82, prevents retraction of the total hammer 35. As the lobes 72 and 73 pass from under the roll 74 and nose 76, the arm 51 of the operating lever 45 rocks to its normal position without effecting any movement to the total hammer.

The electrohammer 36 is also disabled by the plate 80 in the following manner. A projection 85 (Figs. 10 and 11) on the plate 80, when entering the items of a multiple-item transaction, lies in the path of a stud 86, carried by an arm 87 connected by a bail 88 to an upwardly extending arm 89, normally urged clockwise by a spring 90. This arm 89 (Fig. 7) has a notch 91 adapted to cooperate with a stud 92 carried by the electrohammer 36. As long as the disabling plate 80 is in the position shown in Fig. 10, the notch 91 cooperates with the stud 92, thus locking the electrohammer 36 against movement, when the lobes 68 and 99 of the cam 69 rock the bail 60 clockwise. With the parts in such positions, as the lobes 68 and 99 of the cam 69 for the hammer 36 pass from under the roll 59 and nose 97, the spring 62 moves the bail counter-clockwise to its normal position, without effecting any movement of the electrohammer 36.

Therefore, it is seen that during a multiple item entering operation the flange 82 (Figs. 10 and 11) disables the total hammer 35, and the arm 89 disables the electrohammer 36, but neither of these disabling means has any effect on the item hammer 34. The means for controlling the position of the plate 80 is hereinafter described.

As fully set forth in the above mentioned Patent No. 1,812,194, issued to Brand the pins 83 and 156 on the hammers are lowered by a mechanism, so that there is always ample clearance between those pins and the disabling flanges for the hammers.

Such mechanism, in the Brand patent, and in the present application, includes a bail 93 (Figs. 10 and 11) pivoted on the stud 37, which bail is adapted to cooperate with a finger 94 on each of the hammers 34, 35 and 36. Such bail is operated by means fully disclosed in the Brand patent.

In order to facilitate adjustment between the bail and the hammer fingers so that the several parts associated with this bail do not have to be held so close during manufacture, applicant has improved his previous mechanism by providing a special lip 95 on the bail 93, and an adjusting screw 96 threaded in said lip. The lip is wide enough to accommodate all three hammer fingers 94, there being one screw 96 for each hammer. A lock nut 97 is used to maintain the screws 96 in their proper operating positions relative to the fingers 94 after the desired adjustments have been made.

Paper feed mechanism

The mechanism to advance the receipt paper one step, after the printing of each item of a multiple-item transaction, to present a blank portion of the receipt paper to the printing line, to receive the printing of the next item, will now be described.

Figure 12:
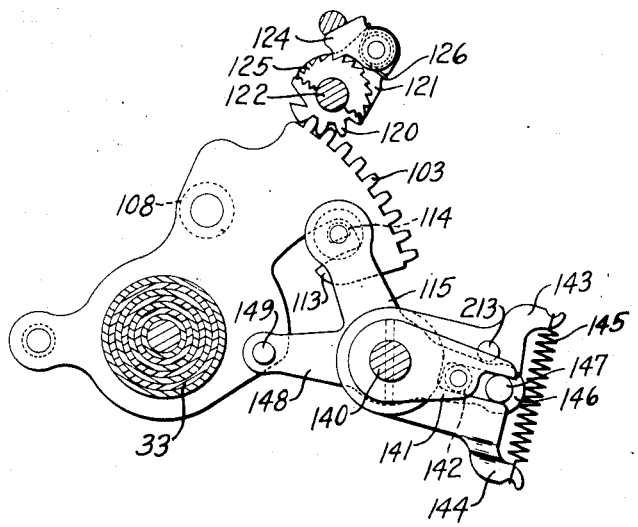
Fig. 12 is a detailed view of the paper feed segment and its controlling mechanism.

The end 107 of a bar 100 (Fig. 6), guided at its left-hand end by a stud 101 projecting from the printer frame 31 into a slot in the bar, and supported at its right-hand end by a feed lever 102, pivoted on the previously mentioned rod 43, normally abuts a stud 108 extending through the frame 31 and secured to a feed segment 103 pivoted on the outermost sleeves 33 (see also Fig. 12), and restrains the latter from clockwise movement by a spring 104. This spring 104 is connected to the segment through a bell crank 105 and a link 106. A pair of rollers 109 and 110 on the feed lever 102, cooperate with cam plates 111 and 112 secured to the cam shaft 70, to rock the feed lever 102 first clockwise and then counter-clockwise during each operation of the machine, to shift the bar 100 first to the right, and then to the left. As the bar 100 is moved to the right the feed segment 103 is rocked clockwise as viewed in Fig. 6, and counter-clockwise as viewed in Fig. 12, under the influence of the spring 104 until a hook 113 of the feed segment 103, is arrested by a stud 114, mounted in an upwardly extending arm of a three-armed lever 115, and projecting into the opening formed by the hook 113. The bar 100 then continues to move its full extent to the right, leaving the feed segment 103 restrained by the stud 114.

The feed segment 103 is provided with teeth, which mesh with a mutilated pinion 120 (Fig. 12), supported on a stud 122 projecting from the printer frame 31.

An arm 121 secured to the pinion 120, supports a feed pawl 124 (Figs. 6, 9 and 12) held, by a spring 126, in contact with a ratchet wheel 125, connected by a mortise and tenon to a feed roller 123. As the bar 100 is moved to the right the feed segment 103 under the influence of the spring 104 rotates the mutilated pinion 120 and arm 121 counter-clockwise until the segment 103 is arrested by the stud 114, thus carrying the feed pawl 124 in a counter-clockwise direction around the ratchet wheel 125. A retaining pawl (not shown, but fully illustrated in the previously mentioned Shipley patents) prevents any counter-clockwise movement of the ratchet wheel 125 and feed roller 123 at this time.

After the impression hammers have been operated, said bar 100 moves idly until the end 107 thereof abuts the stud 108 of the feed segment 103, whereupon, continued movement of the bar 100 to the left rocks feed segment 103 counter-clockwise until returned to its normal position. This counter-clockwise movement of the feed segment 103 rotates the mutilated gear 120 and arm 121 clockwise about the stud 122, and the feed pawl 124 turns the ratchet wheel 125 and feed roller 123 in a clockwise direction to feed the receipt paper 127, one step.

The usual tension roller (not shown, but fully illustrated in the previously mentioned Shipley patents) cooperates with the roller 123 to press the receipt strip against the same.

After the several items of a multiple-item transaction have been printed on the receipt by the above described mechanism, it is necessary to print on the receipt the total of the items, the clerk's initial, the date, the consecutive number, and the kind of transaction, or any other information that may be desired.

As is customary in machines of the type to which the present invention is applied, all totalizing operations consist of two cycles of movement of the main shaft 261.

This machine is, therefore, provided with the usual total lever 290 (Fig. 2) having a slot 291 into which projects a pin 292 on a lever 293 pivoted at 294. Also pivoted at 294 is an arm 295 having a stud 296, which is normally held in contact with the upper end 297 of the lever 293 by a spring 298. The lever 293 and arm 295 together form a slot 299 into which projects a roller 300 on an arm 301 secured to a shaft 302.

In Fig. 2 the total lever is shown in its "add" position. A movement of the lever upwardly, to take a sub-total, or downwardly to take a total, through the cam slot 291, lever 293, and arm 295, rocks the arm 301, and consequently the shaft 302 in a clockwise direction. Secured to this shaft 302 (Fig. 3) is an arm 303 connected by a link 304 to a lever 305 pivoted at 306. Connected to the lever 306 is a pitman 307 slotted to surround the screw stud 283. This pitman carries a roller 308 normally resting in an offset 309 of a cam race 310 in a disk 311. The pitman 307 also has two pins 312 projecting on either side of flange 313 of a coupling slide 314, which is adapted to couple the cam 311 and gear 282.

The clockwise movement of the shaft 302 by the total lever through the connection shown in Fig. 3, moves the pitman 307 to the left to move the coupling slide 314 to couple the gear 282 and cam 311 so that they operate in unison, in a manner fully illustrated and described in United States Letters Patent, No. 1,242,170, granted to Frederick L. Fuller on October 9, 1917.

When the total lever 290 is moved from its adding position into a position to take the total of the several items of a multiple-item transaction, an arm 320 (Fig. 4) fast on the shaft 302 moves a pitman 321 to the right. This pitman carries a roller 322, and by its contact with an arm 323 fast on a printer control shaft 140, moves the latter clockwise to control mechanism, fully described in the Shipley Patent 1,865,147, so that the receipt paper will be given only a short feed during the first cycle of a two-cycle item-total operation.

After the parts have been moved into such positions, the gear 282 is given a complete rotation, thus driving the cam shaft 261 two complete turns for the item-total operation. As the disk 311 is now coupled to the gear 282, the cam race 310, near the end of the first cycle, rocks the shaft 302 still further clockwise for a purpose to be hereinafter described.

It will be recalled that the cam arm 280 (Figs. 1 and 4) is adjusted during adding operations into positions determined by the keys 230 and 231. This arm 280 cooperates with a roller 324 on an arm 325 loose on the shaft 140. The arm 325 has an angular slot into which projects a roller 326 on a link 327, which roller 326 also projects through a straight slot in an arm 328 fast on the shaft 140.

When entering the several items of a multiple-item transaction, the cam arm 280 is set in the position shown in Fig. 4, and the roller 324 cooperates with the lower edge 329 of the cam arm 280, and therefore causes no movement of the arms 325 and 328, nor of the shaft 140. Fig. 1 shows the cam arm 280 in the position to which it is adjusted under control of one of the single-item keys 231, and when set in such position, the higher edge 330 of the cam arm 280 cooperates with the roller 324 and rocks the arm 325, and through the roller 326, rocks the arm 328 and shaft 140 clockwise to control the feeding of the detail strip. It is not thought necessary to go into any further description in connection with the feeding mechanism at this time, and reference may be had to the above mentioned Shipley Patent No. 1,865,147 for a full description of this mechanism.

From the previously described mechanism, it will be remembered that during item entering operations, the total hammer 35 (Fig. 10) was disabled by the flange 82 of the disabling plate 80, cooperating with the stud 83 in the plate 84 secured to the hammer. The electrohammer 36 was also disabled by the locking arm 89. To print the total of the items of a multiple-item transaction, it is necessary that the total hammer and the electrohammer be free to operate.

Figure 10:
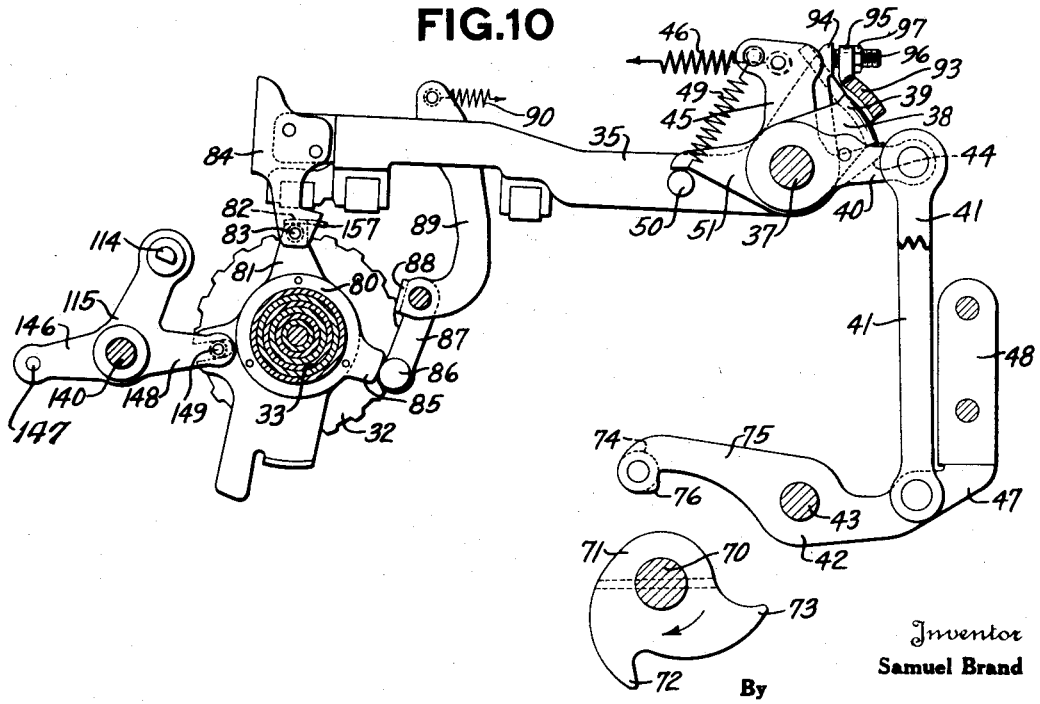
Fig. 10 is a detail view of the operating mechanism for the impression hammers.

During the first cycle of the item-total operation, it is necessary to disable all hammers, and to accomplish this result the shaft 140 has secured thereto an arm 141 (Figs. 6 and 12) which carries a stud 142 projecting between arms 143 and 144 journaled on the shaft 140. These arms 143 and 144 are held in contact with the stud 142 by a spring 145. A forwardly extending arm 146 of the previously mentioned three-arm lever 115 carries a stud 147, which also projects between the arms 143 and 144, whereby, as the shaft 140 is rocked clockwise Fig. 6, and counter clockwise Fig. 12, the stud 142 rocks the arm 143, and the spring 145 rocks the arm 144 which, due to its contact with the stud 147 of the arm 146, rocks the three-armed lever 115 clockwise. A rearwardly extending arm 148 (Figs. 10 and 12) of the three-armed lever 115 has a stud 149 which engages a notch of the disabling plate 80, so that as the shaft 140 receives its initial clockwise movement (Fig. 10), or counter-clockwise (Fig. 12), by the total lever 290, as the latter is moved from its add position into its total position, the three-armed lever 115 rocks the disabling plate 80 slightly in a counter-clockwise direction (Fig. 10).

Such counter-clockwise movement (as viewed in Fig. 10) of the disabling plate 80 is not sufficient movement to move the projection 85 of the disabling plate 80 from in front of the stud 86, and the flange 82 of the disabling plate 80 is not rocked clear of the stud 83 of the total hammer 35. Therefore, the total hammer 35 and the electrohammer 36 are both prevented from being moved to their retracted positions.

The item hammer is also disabled during the first cycle of a total-taking operation. By referring to Figs. 9 and 11, it can be seen that the item hammer 34 is provided with a plate 155 carrying a stud 156 in axial alignment with the stud 83 of the total hammer 35.

Figure 11:
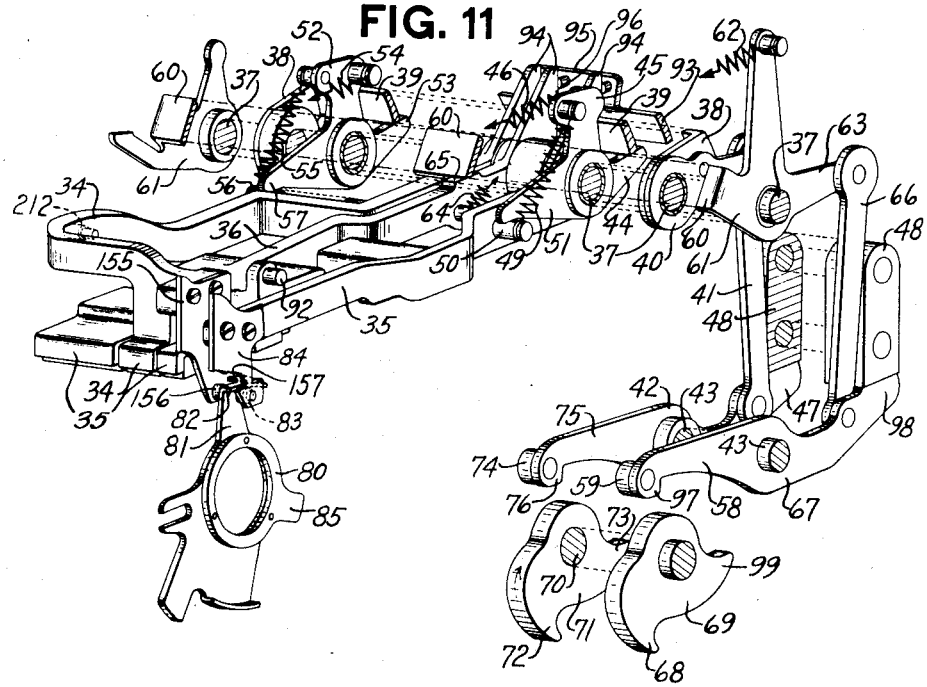
Fig. 11 is a perspective view of the printing hammers, together with certain of the mechanism for controlling their operation, this mechanism being shown in disassembled view for the sake of clearness.

The arm 81 of the disabling plate 80 (Fig. 11) is located between the stud 83 of the total hammer 35 and the stud 156 of the item hammer 34, and has a flange 157 to cooperate with the stud 156. With the disabling plate 80 in the position as shown in Fig. 11, which is the position it assumes when entering the items of a multiple-item transaction, the flange 157 is not in position to hold the stud 156, and the item hammer is free to operate, while the flange 82 is holding the stud 83 of the total hammer 35.

When the disabling plate 80 is rocked counter-clockwise (Figs. 10 and 11) by movement of the totalizing lever, when moved from its add position to a total position, as was previously described, the flange 157 is moved over the stud 156 of the item hammer 34 to disable the same.

From the above description it will be clear that all hammers are disabled during the first cycle of a total-taking or two-cycle operation.

During such first cycle of a totalizing operation the cam plates 111 and 112 rock the feed lever 102 clockwise to withdraw the bar 100 first to the right, and the feed segment 103 is rocked by the spring 104 as previously described. Return of the bar 100 to its normal position by the lever 102, operates the feed segment 103 to turn the pinion 120 and roll 123 to feed the receipt paper. During this cycle the feed segment 103 is stopped by the stud 114 of the three-armed lever 115, since the latter has not been moved a sufficient amount to shift the stud 114 clear of the hook 113 of the feed segment 103. Therefore, the receipt paper receives the same amount of movement during the first cycle of a totalizing operation that it receives during the entry of the several items, to space the total from the last printed item, as can be seen in Fig. 5. However, during this first cycle of a total-taking operation no print is made, thus making the spacing of the total from the last printed record possible.

Near the end of the first cycle of a totalizing operation, the cam race 310 (Fig. 3), as above stated, through the mechanism shown in Figs. 3 and 4, gives the printer control shaft 140 an additional movement in a clockwise direction. This additional clockwise movement of the shaft 140, through the above described arms 141, 143 and 144, rocks the three-armed lever 115 clockwise, whereupon, the arm 148 (Fig. 10) rocks the disabling plate 80 counter-clockwise and removes the projection 85 from in front of the stud 86. The spring 90 can now rock the arm 89 clockwise and withdraw the notch 91 (Fig. 7) from the stud 92 of the electrohammer 36, thus allowing the same to be retracted to effect a printing impression during the second cycle of the item-total operation.

The above mentioned second counter-clockwise movement of the disabling plate 80, also rocks the flange 82 clear of the stud 83 of the total hammer 35, and the flange 157 clear of the stud 156 of the item hammer 34, leaving all hammers free to be operated during the second cycle of a totalizing operation to print the total of the several items.

This additional clockwise movement which the control shaft 140 (Fig. 6) receives near the end of the first cycle of a totalizing operation also rocks the lever 115, so that the stud 114 is clear of the hook 113 of the feed segment 103, so that during the second cycle of operation the check strip is given a longer feed to position it to receive the printing on the stub portion thereof, after which the receipt is issued from the machine.

Near the end of the second cycle of a totalizing operation, the control shaft 140 is returned to the position in which all hammers are disabled. When the total lever 290 is moved from its totalizing to its adding position, the control shaft 140 is moved into its normal position whereby the item hammer 34 is free to operate, but the total hammer 35 and electrohammer 36 remain locked.

A short résumé of the printing and feeding of the itemized check will be given. Before starting a multiple-item entry operation the receipt strip is in position to have the first item printed thereon, and the heading (Fig. 5) "We appreciate your patronage" is already printed thereon, such heading having been printed during the preceding operation of the machine. After each item is printed the feed segment 103 is given a short feed, the stud 114 being within the notch formed by the shoulder 113 (Fig. 12) on the feed segment 103. During the first cycle of a total taking operation the stud 114 remains within the notch in the feed segment 103, and therefore another short feed is effected during such first cycle of a total taking operation. Since no printing takes place during the first cycle of a total taking operation, the short feed given the strip during the first cycle of a total taking operation, together with the short feed given the strip after the last item has been printed, provides a double space between the last printed item and the printed total (see Fig. 5), such total being printed during the second cycle of operation. Just prior to the beginning of the second cycle of operation the stud 114 is withdrawn from the notch in the segment 103 and then after the first total print is made, the segment 103 is released to permit the segment to move its maximum extent to feed the receipt far enough to space the receipt paper so that a subsequent total print is made on the stub of the receipt. During this operation the heading is printed on the receipt paper for the next receipt to be issued by the machine. After these impressions are made the paper receives another long feed to feed the printed receipt out of the machine. Thereafter the receipt is severed from the strip, leaving the heading on the paper left in the machine ready for the printing of the next receipt.

The machine to which the present invention is applied is also adapted to print and issue a single-item receipt.

When a single-item key 231 (Fig. 1) is operated, the high edge 330 of the cam arm 280 controls the shaft 140, as above stated, whereby it is set to the position to which it is moved during the second cycle of a totalizing operation, so that the flanges 82 and 157 and the projection 85 allow all hammers to operate.

With the control shaft 140 in such position, the stud 114 (Fig. 6) on lever 115 is clear of the hook 113, and the feed segment 103 can travel its full extent to issue a single-item receipt from the machine.

Stub receipt

When producing a stub receipt in connection with either single-item transactions or multiple-item transactions, it is necessary to give the impression hammers an extra operation, and to accomplish this the cam 71 has two lobes 72 and 73, and the cam 69 has two lobes 68 and 99 (Figs. 10 and 11). It is also necessary to give the feed bar 100 (Fig. 6) an extra operation to feed the receipt paper an additional distance to form the stub section.

Therefore, when entering items, means must be provided to disable one of the operations of the item hammer, and prevent movement of the feed segment 103 the second time, otherwise each item would be printed twice on the receipt.

One convenient means of accomplishing the above objects, is disclosed herein as being conveniently controlled by a paper slackening mechanism, and is as follows:

Pivoted on a stud 162 on the frame 31 is a pair of arms 160 and 161 (Figs. 6, 7 and 9) connected by a yoke 163. Also pivoted on the stud 162 are two other arms 166 and 171 connected by a yoke 164. The yokes 163 and 164 are connected to operate in unison by a pin 165. The arm 166 supports one end of a link 167, the opposite end of which is slotted to embrace a stud 168 on a paper slacking arm 169. A spring 170 connected to the link 167 tends to urge the arm 166 and yokes 163 and 164 clockwise about the stud 162, but the stud 168 prevents such movement. The arm 171 has a stud 172 which projects into a slot 173 of a hammer disabling link 174. The opposite end of the link 174 is pivoted to a lever 175 mounted on a stud 176 on the frame 31. A spring 177 tends to move the link 174 towards the left (Fig. 6).

Cam plates 180 and 181 (Fig. 6) mounted on a stud 182 in the frame 30, are secured to a gear 183 meshing with a gear 184 secured to the printer cam shaft 70. A lever 187 carries rollers 185 and 186 which cooperate with the cams 180 and 181 respectively. The lever 187 also carries a stud 192 engaged by a forked arm 189 pivoted on a stud 190, and connected by a yoke 191 to the paper slacking arm 169. By the above described means, the paper slacking arm 169 is rocked first counter-clockwise and then clockwise to produce a slack in the paper strip 127.

The paper strip 127 (Fig. 6) is fed between a guide stud 200, carried by a bracket 201 on the frame 31, and a stud 202 on the arm 169, then under a guide stud 203 to the feed roller 123. Two pairs of locking pawls 204 (Figs. 6 and 9), connected by a yoke 205, have their ends held against the paper adjacent the guide stud 203, by springs 206, to lock the paper 127 against movement in the direction opposite from the feeding direction. As the arm 169 is rocked counter-clockwise, the stud 202 draws paper from the supply roll and carries it upwardly around the guide stud 200, the locking pawls 204 preventing the paper from being drawn rearwardly from the feed rollers. With such slack made in the strip, the feed roller 123 is relieved from unwinding the paper from the supply roll, and there is no tendency of the paper to slip while the feed rollers are turning to feed the paper, all friction caused by any tendency of the supply roll to stick being eliminated.

As the arm 169 (Fig. 6) is rocked counter-clockwise, the spring 170 causes the link 167 to move to the right and rock the yokes 163 and 164, and arms 160 and 161 in a clockwise direction. At the same time the spring 177 shifts the link 174 to the left, whereupon a detent 210 thereon enters a notch 211 in the strip feeding pinion 120 to prevent movement of the same.

The yokes 163 and 164, and arms 160 and 161, continue their clockwise movement under the influence of the spring 170 until the stud 172 on the arm 171 contacts the left-hand side of the slot 173 of the disabling link 174 which arrests the yokes 163 and 164 and arms 160 and 161 (Figs. 6 and 7).

The arm 160, when thus arrested, is over the stud 92 of the electrohammer 36, and the arm 161 (Fig. 9) is over a stud 212 carried by the item hammer 34, the stud 212 being in axial alignment with the stud 92 of the electrohammer 36. The stud 168 (Fig. 6) now travels in the slot in the link 167 during the remainder of the counter-clockwise movement of the arm 169.

After the arm 169 has been given its full extent of counter-clockwise movement, and before it starts its return clockwise movement, the lobe 72 of the cam 71 (Fig. 11) operates the levers 42 to retract the hammer operating levers 45 and 52, but, since the arm 161 is above the stud 212 (Fig. 9) of the item hammer 34, the latter cannot retract at this time, and consequently no impression is made thereby.

The arm 160 (Fig. 7) is also above the stud 92 of the electrohammer 36 to prevent its retraction, but at this particular point in the operation when entering the items of a multiple-item transaction, and as previously described, the electrohammer 36 and the total hammer 35 (Fig. 10) are disabled by the notch 91 of the arm 89 (Fig. 7) cooperating with the stud 92 of the electrohammer 36, and by the flange 82 (Fig. 10) of the plate 80.

From the above description it is clear that during the entry of an item of a multiple-item transaction, the total hammer 35, the electrohammer 36, and the item hammer 34 (Fig. 9) are disabled during the first operation of the hammer operating levers 42 and 67 caused by the lobes 72 and 68 of the cams 71 and 69, respectively.

It will also be remembered that in order to feed the paper in the proper manner, to print on the body and also on a stub portion of the receipt, the bar 100 is drawn to the right twice during each operation of the machine. After the arm 169 (Fig. 6) has reached the limit of its counter-clockwise movement, as was just described, and the detent 210 is in the recess 211 of the pinion 120, the bar 100 receives its first movement to the right, but as the pinion 120 is held against movement by the detent 210, the feed segment 103 is also held against movement. After the lobes 72 and 68 (Figs. 7 and 11) of the cams 71 and 69, respectively have passed the arms 75 and 58, the bar 100 is returned to its normal position by the lever 102 without feeding the paper strip.

Before the lobes 73 and 99 (Figs. 10 and 11) of the cams 71 and 69 cooperate with the arms 75 and 58, and before the bar 100 (Fig. 6) receives its second movement to the right, the arm 169 is returned to the position as shown in Fig. 6, thus restoring the disabling link 174, and arms 160 and 161 to their normal positions, which frees the item hammer 34. The electrohammer 36 and total hammer 35 remain locked by the arm 89 and plate 80. Now as the lobe 73 (Fig. 11) cooperates with the roll 74 of the arm 75, the item hammer 34 is retracted and operated to print the item.

After such impression by the item hammer 34, the bar 100 (Fig. 6) receives its second movement to the right, and as the hook 210 is out of the recess 211, the feed segment 103 is free to follow the bar 100, under the influence of the spring 104 until stopped by the stud 114 in the previously described manner.

Therefore, the end 107 of the bar 100 on its return movement contacts the stud 108 and returns the feed segment 103 to its normal position, causing the paper to be advanced one step through the previously described mechanism, to receive the impression of the following operation.

After the several items of a multiple-item transaction have been printed, the total lever 290 is moved from its adding position to the totalizing position, to control the machine to print the total of those items. It will be remembered that the total lever controls the machine to make two cycles of operation, and also the movement of the lever from its add position, rocks the printer control shaft 140 (Fig. 6) slightly in a clockwise direction to disable all impression hammers during both actuations of the hammer operating levers 45, 52 and 61 during the first cycle of operation, and near the end of the first cycle, the machine moves the control shaft 140 a greater distance in the same direction, to free all impression hammers for the second cycle.

The feed segment 103 operates during the first cycle, the same as during an adding operation, that is, upon the first movement of the bar 100 the feed segment 103 is locked by the detent 210, but is free to follow the bar 100 on its second movement until stopped by the stud 114 thus advancing the receipt paper one step, during the first cycle, to space the total of the several items from the last item, as was previously described.

Near the end of the first cycle, when the printer control shaft 140 (Fig. 6) receives its second movement, to rock the stud 114 clear of the hook 113 to permit the feed segment 103 to follow the bar 100 to the full extent of its movement, and to rock the disabling plate 80 to free all the impression hammers during the second cycle, a stud 213 (Figs. 6 and 12) on the arm 143 is positioned under the foot of the lever 175 which supports the left-hand end of the disabling link 174 to hold the link 174 against movement during the second cycle.

Now as the arm 169 receives its counter-clockwise movement at the beginning of the second cycle of a totalizing operation, the spring 170 begins to move the link 167 and arms 160 and 161, which movement is stopped when the stud 172 contacts the left end of the slot in the link 174, the latter being restrained at this time by the contact of the foot of the lever 175 with the pin 213.

The above short movement of the arms 160 and 161 is sufficient to move the arm 160 over the stud 92 to prevent retraction of the electrohammer upon the first actuation of the operating lever 61 (Fig. 7), but is not sufficient to position the arm 161 over the stud 212 of the item hammer because the arm 161 is not as wide as the arm 160, as shown by the dotted lines in Fig. 7, therefore, said item hammer, together with the total hammer, prints the total of the items upon the first actuation of the hammer operating levers 45, 52 and 61. Also, during such first actuation of the levers 45, 52 and 61, the total hammer prints the character of the transaction, the clerk's initial, the consecutive number, and the words "Total amount of purchase", upon the main portion of the receipt, and prints the date on the stub portion of the receipt.

After the above impression has been made, the bar 100 (Fig. 6) receives its first movement to the right, and as the stud 114 is clear of the hook 113, and as the detent 210 is disengaged from pinion 120, the feed segment 103 is free to follow the bar 100, whereupon, as the latter receives its return movement, the feed segment 103 is actuated to advance the receipt to bring the stub section to the printing line. Before the impression is made on the stub portion, the arm 169 is returned to its normal position to restore the arms 160 and 161 to their normal positions.

Now, as the lobes 73 and 99 operate the levers 42 and 67, respectively, all hammers are free to be retracted by the levers 45, 52 and 61, and the total is printed on the stub portion of the receipt (Fig. 5), just above the date which was printed on the first operation of the hammers. The electrohammer prints the words "We appreciate your patronage" (or any desired wording) below the stub portion, which words serve as the heading for the receipt to be issued during the following transaction. At the same time the date is also printed just below the quoted words.

The electrohammer 36 (Fig. 7) is also adapted to perforate the receipt to form the stub portion. An L-shaped arm 220 (Figs. 7, 8 and 9) secured by a flange 221 to the electrohammer 36, carries a plate 222 having perforators 224 to cut through the paper. A guide plate 223, suitably mounted in the machine, and over which the paper is advanced, is provided with a series of slots into which the perforators 224 enter. As the electrohammer 36 receives its excursion, the momentum thereof on its impression taking stroke, causes the perforators 224 to make a perforated line across the strip to form the main and stub sections of a receipt. The perforators 224 are of sufficient length to allow for the impression movement of the electrohammer 36 after said perforators have pierced the paper.

After the receipt has been so perforated, the bar 100 (Fig. 6) receives its second movement to the right, the feed segment 103 is then free to follow the bar under the influence of the spring 104, whereupon the segment 103 is rocked to feed the receipt out of the machine as the bar 100 is restored to normal. A strip severing plate (not shown, but illustrated in the previously mentioned Shipley patents) is provided to cut the receipt from the strip when it is removed from the machine, leaving the electroprinting and the date, on the end of the receipt paper retained within the machine, below which the amount entered on the next operation is printed.

Near the end of the second cycle of a totalizing operation, the printer control shaft 140, as previously described, is restored to the position to which it was moved by the movement of the total lever 290 when the latter was moved from its "add" to its totalizing position. The shaft 140 remains in such position until the total lever 290 is moved to its add position, the return movement of the lever restoring the shaft 140 to the position shown in Fig. 6.

When issuing a single-item receipt, the previously described cam arm 280 (Figs. 1 and 4) rocks the printer control shaft 140 to the position it assumes during the second cycle of a totalizing operation, so that all hammers will operate in exactly the same manner as they do during the second cycle of a totalizing operation.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:

1. In a machine adapted to print and issue multiple-item stub receipts; means to drive the machine through one cycle of movement for the entry of each item, and through two cycles of movement to take the total of the items entered; a plurality of printing hammers; an operating device for each hammer; means to retract each device twice during each cycle of movement; and automatic means, to render all hammers ineffective upon the first retraction of said devices and all except one of the hammers ineffective upon the second retraction of said devices during all single-cycle movements, to render all hammers ineffective upon both retractions of said devices during the first cycle of a two-cycle movement and one hammer ineffective upon the first retraction of said devices and all hammers effective upon the second retraction of said devices during the second cycle of a two-cycle movement.

2. In a machine adapted to make single and double cycle operations; a plurality of printing hammers; an operating device for each hammer; means to retract each operating device twice during each cycle of operation; a projection on each of the hammers; a device including a plurality of arms rigidly connected together and adapted to be moved into cooperative relation with said projections to control the hammers to prevent their retraction by the retracting means; and means to determine whether one or both of said arms shall exercise such control.

3. In a machine of the class described; the combination with a plurality of impression means; of a rockable arm; a link supported by said arm and connected to a yoke member; means to cause the link to follow the arm when the latter is moving in one direction; a bail having a plurality of arms cooperating with the impression means; a driving connection intermediate the yoke member and the bail, mechanism to control said bail to disable certain of said impression taking means when the bail is in one position, and to all of said impression means when said bail is in a different position, and means carried by said arm to restore the bail, yoke and said mechanism to normal positions.

4. In a machine of the class described, the combination of impression means; a rockable arm; a yoke member; a driving connection intermediate the arm and the yoke member; a bail adjustable to a plurality of positions and having arms of different widths to cooperate with the impression means; means to drive the bail from the yoke member; a link connected to the yoke member to control said bail to disable one impression taking means when the bail is in one position, and to disable all of said impression taking means when the bail is in another position.

5. In a machine of the class described, the combination of impression means; paper feeding mechanism; an arm for slacking the paper; a yoke member; driving connection intermediate the yoke member and said arm; adjustable means having arms of different widths to cooperate with the impression means; a connection to drive the adjustable means from the yoke member; a device connected to the yoke member to control the setting of the adjustable means whereby the latter disables one impression means when set in one position and both impression means when set in another position; and means carried by said device to disable the paper feeding mechanism when both impression means are disabled.

6. In a machine of the class described, the combination of impression means; paper feeding mechanism; a means for slacking the paper preparatory to feeding the same; means to drive the slacking means; a yoke member; means to operate the yoke member with the slacking means; a device having arms of different widths to cooperate with the impression means; means to drive the device with the yoke member; means to determine the position to which the yoke member and device are to be moved to disable certain of said impression means; and means carried by said determining means to disable the paper feeding mechanism.

7. In a machine of the class described, the combination of impression means; paper feeding mechanism; means for slacking the paper before feeding the same; a device having arms of different widths to cooperate with the impression means to control the same to disable certain of said impression means when the arms are set in certain positions; a link connected to said device to control the same; means carried by said link to lock the paper feeding mechanism; and means to move the link to its locking position.

8. In a machine of the class described, the combination of impression means; paper feeding mechanism; means for slacking the paper before feeding the same; a bail having arms of different widths, and adapted to be shifted into a plurality of positions to disable certain of said impression means when in certain positions; driving means intermediate the bail and the slacking means, including a yoke member; control means to determine the position to which the yoke member is to be moved; means carried by said control to disable the feeding mechanism; means to move the control means to its locking position; and a means to prevent movement of said link.

SAMUEL BRAND.